United States Patent
Lee et al.

(10) Patent No.: US 8,312,739 B2
(45) Date of Patent: Nov. 20, 2012

(54) DUAL STAGE ION EXCHANGE FOR CHEMICAL STRENGTHENING OF GLASS

(75) Inventors: Christopher Morton Lee, Corning, NY (US); Lawrence George Mann, Painted Post, NY (US); Jose Mario Quintal, Campbell, NY (US); Yongsheng Yan, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 395 days.

(21) Appl. No.: 12/510,599

(22) Filed: Jul. 28, 2009

(65) Prior Publication Data

US 2010/0028607 A1    Feb. 4, 2010

Related U.S. Application Data

(60) Provisional application No. 61/084,398, filed on Jul. 29, 2008.

(51) Int. Cl.
*C03C 15/00* (2006.01)
(52) U.S. Cl. ........................... 65/30.14; 65/30.13
(58) Field of Classification Search .............. None
See application file for complete search history.

(56) References Cited

U.S. PATENT DOCUMENTS

| | | | |
|---|---|---|---|
| 3,410,673 A * | 11/1968 | Marusak | 65/30.14 |
| 3,433,611 A * | 3/1969 | Kubichan et al. | 65/30.14 |
| 3,751,238 A | 8/1973 | Grego et al. | |
| 3,798,013 A * | 3/1974 | Inoue et al. | 65/30.14 |
| 4,022,628 A | 5/1977 | Deeg | |
| 4,119,760 A | 10/1978 | Rinehart | |
| 4,192,689 A | 3/1980 | Rinehart | |
| 4,218,230 A * | 8/1980 | Hogan | 65/30.14 |
| 4,273,832 A * | 6/1981 | Hogan | 428/410 |
| 4,483,700 A | 11/1984 | Forker, Jr. et al. | |
| 4,671,814 A * | 6/1987 | Aratani et al. | 65/30.14 |
| 4,846,868 A * | 7/1989 | Aratani | 65/30.14 |
| 4,859,636 A * | 8/1989 | Aratani et al. | 501/72 |
| 5,674,790 A | 10/1997 | Araujo | |
| 6,516,634 B1 * | 2/2003 | Green et al. | 65/30.14 |
| 6,518,211 B1 * | 2/2003 | Bradshaw et al. | 501/69 |
| 7,666,511 B2 * | 2/2010 | Ellison et al. | 428/426 |
| 2008/0020919 A1 | 1/2008 | Murata | |
| 2010/0009154 A1 * | 1/2010 | Allan et al. | 428/220 |

OTHER PUBLICATIONS

Fundamentals of Inorganic Glasses, 2nd ed., 2006, by A. K. Varshneya.
Relaxation in Glass and Composites, 1992, by G. W. Scherer.
The Mathematics of Diffusion, 2nd ed., 1975, by J. Crank.

* cited by examiner

Primary Examiner — Jason L. Lazorcik
(74) Attorney, Agent, or Firm — Robert P. Santandrea

(57) ABSTRACT

A method of chemically strengthening a glass. The method includes ion exchange of the glass in a first bath, followed by immersion in the second bath. The first bath is diluted with an effluent ion. The second bath has a smaller concentration of the effluent ion than the first bath. The method provides a compressive stress at the surface of the glass that is sufficient to arrest flaws introduced by contact forces at the surface of the glass while having sufficiently deep compressive depth-of-layer for high reliability.

16 Claims, 5 Drawing Sheets

DUAL STAGE ION EXCHANGE FOR CHEMICAL STRENGTHENING OF GLASS

CROSS REFERENCE TO RELATED APPLICATIONS

This application claims the benefit of U.S. Provisional Application No. 61/084,398, filed Jul. 29, 2008.

BACKGROUND

The invention relates to chemical strengthening of glasses. More particularly, the invention relates to the use of ion exchange processes to strengthen glasses. Even more particularly, the invention relates to a process comprising multiple ion exchange processes.

Chemically strengthened glass have recently been identified for use in hand held devices, such as mobile phones, media players, and other devices, as well as other applications requiring transparency, high strength and abrasion resistance.

Ion exchange is a chemical strengthening process that starts with a glass containing smaller ions (effluent ions) that are capable of exchange with larger ions (exchange ions) in a molten salt bath at elevated temperatures—i.e., the larger ions replace the smaller ions in the glass. The larger, densely packed ions at the glass surface generate a high compressive stress, which in turn provides higher strength.

During the ion exchange process, however, the salt bath becomes increasingly diluted by the smaller effluent ions (counter ions) that are exchanged out of the glass. Salt counter ion concentration increases proportionally with the volume or number of glass parts that are ion exchanged in a salt bath. Whereas "fresh" unused salt provides the highest compressive strength, every subsequent ion exchange run increases the concentration of the smaller ions that are exchanged out of the glass and into the molten salt bath. Conversely, the concentration of the salt that provides the larger ions in the bath decreases. With continued use of the same bath, the compressive stress of the finished products is reduced. The increased dilution of the bath is typically compensated for by replacing at least a portion of the salt bath, based on ion exchange production volume or when the compressive stress of the ion exchanged glass reaches a minimum acceptable value. While such practices are adequate to maintain a minimal compressive stress in the glass, they result in significant variability and constant cyclical fluctuation in compressive stress of chemically strengthened glasses during production.

In dual stage ion exchange (DIOX), the glass undergoes ion exchange in a first, "fresh" salt bath followed by a second ion exchange in a second salt bath that has a diluted effluent ion concentration. This method sacrifices the compressive stress of the surface of the glass. This is unacceptable in hand held device applications, because it does not provide protection from surface flaws that are introduced by contact forces that may be encountered during common use of the device.

SUMMARY

The present invention provides a method of chemically strengthening a glass. The method includes ion exchange of the glass in a first bath, followed by immersion in the second bath. The first bath is diluted with an effluent ion, and the second bath having a smaller concentration of the effluent ion than the first bath. The method provides a compressive stress at the surface that is sufficient to arrest flaws introduced by contact forces at the surface of the glass while having sufficiently deep compressive depth-of-layer for high reliability.

Accordingly, one aspect of the invention is to provide a method of strengthening a glass. The method comprises creating a compressive stress in an outer region of the glass extending from a surface of the glass to a depth-of-layer, the compressive stress being sufficient to arrest flaws within the glass and to arrest flaws at the surface introduced by contact forces at the surface. The compressive stress is created by: providing a glass having a plurality of first metal ions within the outer region; ion exchanging a first portion of the plurality of first metal ions in the outer region of the glass with a plurality of second metal ions in a first salt bath, wherein the first salt bath is diluted with a first concentration of the first metal ions; and ion exchanging a second portion of the plurality of the first metal ions in the outer region of the glass with a plurality of the second metal ions in a second salt bath, wherein the second salt bath has a second concentration of the first metal that is less than the first concentration.

A second aspect of the invention is to provide a method of strengthening a glass. The method comprising the steps of: providing a glass, the glass comprising a plurality of ions of a first metal, each of the ions having a first ionic radius; immersing the glass in a first ion exchange bath, the first ion exchange bath comprising a plurality of ions of a second metal and a first concentration of ions of the first metal, wherein each of the ions of the second metal has a second ionic radius, the second ionic radius being greater than the first ionic radius; and immersing the glass in a second ion exchange bath after immersing the glass in the first ion exchange bath, the second ion exchange bath comprising a plurality of ions of the second metal and a second concentration of ions of the first metal, wherein the second concentration is less than the first concentration, wherein a portion of the plurality of ions of the first metal in the glass are replaced by ions of the second metal to create a compressive stress in a surface region of the glass.

A third aspect of the invention is to provide a method of reducing variability of compressive stress in a chemically strengthened glass article. The method comprises the steps of: providing a glass article, the glass comprising a plurality of ions of a first metal, each of the ions having a first ionic radius; immersing the glass article in a first ion exchange bath, the first ion exchange bath comprising a plurality of ions of a second metal and a first concentration of ions of the first metal, wherein each of the ions of the second metal has a second ionic radius, the second ionic radius being greater than the first ionic radius; and immersing the glass article in a second ion exchange bath after immersing the glass in the first ion exchange bath, the second ion exchange bath comprising a plurality of ions of the second metal and a second concentration of ions of the first metal, wherein the second concentration is less than the first concentration. A portion of the plurality of ions of the first metal in the glass are replaced by ions of the second metal to strengthen the glass article by creating a compressive stress in a surface region of the glass article that is greater than a predetermined compressive stress.

These and other aspects, advantages, and salient features of the present invention will become apparent from the following detailed description, the accompanying drawings, and the appended claims.

DETAILED DESCRIPTION

Figure 1:
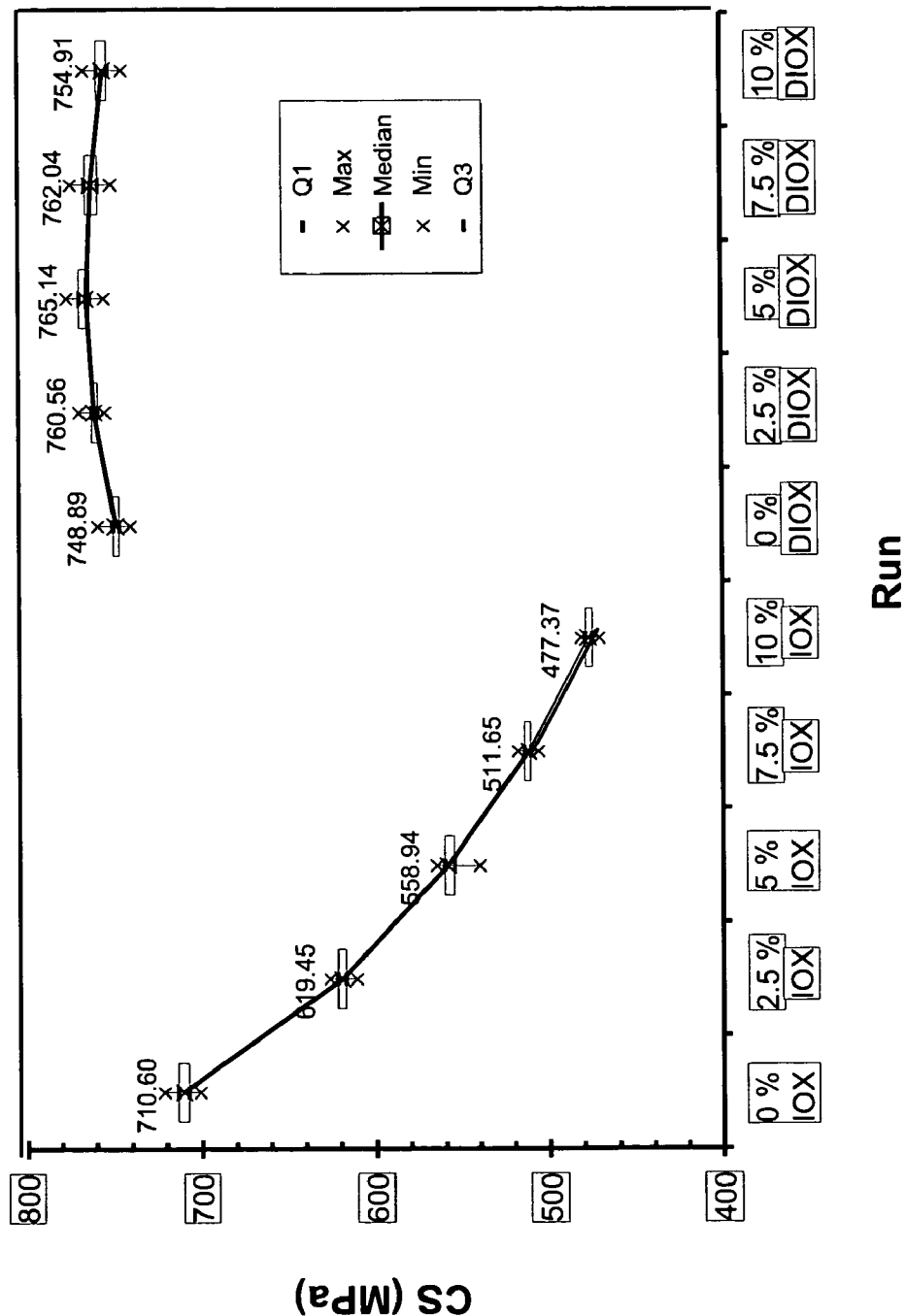
FIG. 1 is a plot of compressive stress versus dilution with $NaNO_3$ of primary and secondary ion exchange salt baths.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general, it will be understood that the illustrations are for the purpose of describing a particular embodiment of the invention and are not intended to limit the invention thereto. The drawings are not necessarily to scale, and certain features and certain views of the drawings may be shown exaggerated in scale or in schematic in the interest of clarity and conciseness.

Surface compressive stress (also referred to herein as "CS") and depth of the CS layer (also referred to herein as "depth of layer" or "DOL") are two factors that affect the performance of chemically strengthened glass performance. Compressive stress and DOL combined are necessary to protect against the propagation of micro-flaws that are artifacts created by normal finishing processes. CS provides resistance to damaging contact forces, such as blunt or sharp impacts. If the depth of layer is adequate, compressive strength is directly proportional to the strength and impact energy resistance of the chemically strengthened glass.

Factors that can reduce achievable CS include salt counter ion concentration (the concentration of the effluent ion in the molten salt bath), higher processing temperatures, and long processing times that are needed to obtain adequate DOL. Whereas processing time and temperature can be controlled, salt counter ion concentration increases proportionally to the volume or number of glass parts that are ion exchanged in the salt bath. "Fresh" salt (i.e., salt newly introduced to the bath) provides the highest CS in chemically strengthened glass. Every subsequent run, however, increases the concentration of the small ions exchanged out of the glass into the molten salt bath. Conversely, the concentration of the salt that provides the larger ions decreases with each glass part strengthened in a bath, consequently reducing CS of finished product, despite carrying out the ion exchange process at constant temperature and time. In high volume production, significant variability in compressive strength may therefore be observed from one glass article to the next.

A dual stage ion exchange (DIOX) process for strengthening glass and reducing the variability of compressive stress in glass is provided and described herein. The process is capable of maintaining a high, and stable, surface compressive strength when chemically strengthening a number of glass articles in a production setting. The process includes a first or primary exchange and a second (secondary) exchange. In the primary stage exchange, the glass is strengthened to a desired depth of layer (DOL) in a first molten salt bath. The first molted salt bath that is diluted with effluent, or exchangeable (i.e., effluent ions, or ions that are exchanged out of the glass and replaced by larger ions), metal ions (also referred to herein as "ions"). For example, if Na$^+$ ions are the effluent ions, the salt bath is diluted with Na$^+$ ions. The presence of the effluent ions in the bath decreases the compressive stress of the glass parts. However, each additional ion exchange run does not significantly change the percentage of effluent ions in the bath, and the compressive stress therefore does not degrade as rapidly as would be the case for an undiluted salt bath.

In the secondary stage exchange (which follows the primary exchange), the glass strengthened in the primary exchange is then chemically strengthened in a second stage molten salt bath that containing the same exchange ions, with much lower (or zero) effluent ion concentration than in the first stage bath, to restore the compressive stress to the desired level. As much of the ion exchange necessary to achieve an adequate depth of compressive layer occurs in the primary stage, only a relatively small portion of the exchange takes place in the secondary stage. Thus, the rate or degree of salt dilution is significantly reduced in the second stage.

The dual stage ion exchange process described herein is capable of maintaining consistently high compressive stress in the final glass product, despite increasing effluent ion dilution rate in the primary stage bath. This process is also expected to have more efficient salt utilization by allowing the primary salt bath to be used to a point where the compressive stress after the primary ion exchange is below a lower CS specification limit. In addition, the process also minimizes equipment downtime associated with salt replacement and provides improved process stability, higher compressive strength values, more efficient salt utilization, and overall higher mechanical reliability of products.

In one embodiment, the glass is an alkali aluminosilicate glass. In one embodiment, the alkali aluminosilicate glass comprises, consists essentially of, or consists of: 60-70 mol % SiO$_2$; 6-14 mol % Al$_2$O$_3$; 0-15 mol % B$_2$O$_3$; 0-15 mol % Li$_2$O; 0-20 mol % Na$_2$O; 0-10 mol % K$_2$O; 0-8 mol % MgO; 0-10 mol % CaO; 0-5 mol % ZrO$_2$; 0-1 mol % SnO$_2$; 0-1 mol % CeO$_2$; less than 50 ppm As$_2$O$_3$; and less than 50 ppm Sb$_2$O$_3$; wherein 12 mol %$\leq$Li$_2$O+Na$_2$O+K$_2$O$\leq$20 mol % and 0 mol %$\leq$MgO+CaO$\leq$10 mol %. In another embodiment, the alkali aluminosilicate glass comprises, consists essentially of, or consists of: 64 mol %$\leq$SiO$_2$$\leq$68 mol %; 12 mol %$\leq$Na$_2$O$\leq$16 mol %; 8 mol %$\leq$Al$_2$O$_3$$\leq$12 mol %; 0 mol %$\leq$B$_2$O$_3$$\leq$3 mol %; 2 mol %$\leq$K$_2$O$\leq$5 mol %; 4 mol %$\leq$MgO$\leq$6 mol %; and 0 mol %$\leq$CaO$\leq$5 mol %, and wherein: 66 mol %$\leq$SiO$_2$+B$_2$O$_3$+CaO$\leq$69 mol %; Na$_2$O+K$_2$O+B$_2$O$_3$+MgO+CaO+SrO>10 mol %; 5 mol %$\leq$MgO+CaO+SrO$\leq$8 mol %; (Na$_2$O+B$_2$O$_3$)−Al$_2$O$_3$$\leq$2 mol %; 2 mol %$\leq$Na$_2$O−Al$_2$O$_3$$\leq$6 mol %; and 4 mol %$\leq$(Na$_2$O+K$_2$O)−Al$_2$O$_3$$\leq$10 mol %. The alkali aluminosilicate glass is, in some embodiments, substantially free of lithium, whereas in other embodiments, the alkali aluminosilicate glass is substantially free of at least one of arsenic, antimony, and barium. In other embodiments, the alkali aluminosilicate glass is down-drawable by those techniques known in the art, such as, but not limited to, fusion-draw processes, slot-draw processes, and re-draw processes.

In one particular embodiment, the alkali aluminosilicate glass has the composition: 66.7 mol % SiO$_2$; 10.5 mol %

$Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$. In another particular embodiment, the alkali aluminosilicate glass has the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$.

In practice, the primary and secondary salt baths are prepared by adding the desired amount of effluent salt and the salt of the ion to be exchanged with the effluent in the glass. In one embodiment, the ions are alkali metal ions—i.e., $Li^+$, $Na^+$, $K^+$, $Cs^+$, and $Rb^+$. Larger alkali metal ions in the bath replace smaller alkali metal ions in the glass. For example, $Li^+$ ions in the glass may be replaced with $Na^+$, $K^+$, $Cs^+$, or $Rb^+$ ions, $Na^+$ ions in the glass may be replaced with $K^+$, $Cs^+$, or $Rb^+$ ions, and so on. Typically, the alkali metal ions in the glass are exchanged with ions of the next largest alkali metal ion. For example, $Na^+$ ions in the glass is usually exchanged with $K^+$ ions in the bath. For both the primary and secondary ion exchange baths, the salt (or salts) is melted and heated to a predetermined temperature, typically in a range from about 380° C. up to about 450° C., and the bath is held at that temperature to stabilize for a predetermined time. In one embodiment, the salt bath is held at temperature for about 12 hours. It will be appreciated by those skilled in the art that other temperatures and stabilization times may be used.

In one embodiment, "fresh" unused salt may be used to prepare the primary stage bath. Alternatively, a previously diluted salt bath may be used as the primary salt bath. It is preferred that fresh salt be used to prepare the secondary bath salt bath, although a previously used bath having a considerably lower salt dilution than the primary stage bath may be used instead.

Prior to immersion in the primary salt bath, glass samples are pre-heated to prevent thermal shock and minimize bath loading (i.e., cooling) effects. The pre-heating temperature depends on the temperature of the salt bath. The sample is then immersed in the primary bath, and the primary ion exchange stage is carried out at a first predetermined temperature for a time sufficient to achieve a desired depth of layer, at which point the glass sample is removed from the primary salt bath and allowed to cool. The glass sample may be rinsed with water to remove residual dried salt and to prevent contamination of the secondary stage bath, and then dried to remove residual moisture. The glass may optionally be annealed between respective immersions in the primary and secondary salt baths.

Before immersion in the secondary ion exchange bath, the glass sample is again pre-heated. The secondary ion exchange stage is carried out in the secondary stage bath having either fresh salt (or a significantly lower dilution rate than the primary stage) to increase or stabilize the compressive stress created in the primary stage ion exchange. The sample is immersed in the bath, and the secondary ion exchange stage is carried out at a second predetermined temperature for a time sufficient to achieve the desired compressive stress, at which point the glass sample is removed from the secondary salt bath and allowed to cool. The glass sample may be rinsed with water to remove residual dried salt and to prevent contamination of the secondary stage bath, and then dried to remove residual moisture.

Compressive stress resulting from the chemical strengthening process described herein can be measured using either non-destructive methods, such as, for example, the Orihara FSM-6000 stress-optical meter, which measures surface compressive stress, or destructive tests such as four point bend, three point bend, ring on ring, ball drop tests, and the like.

The following examples illustrate the features and advantages of the invention, and are in no way intended to limit the invention thereto.

A $KNO_3$ salt bath was purposely diluted with 0 wt %, 2.5 wt %, 5 wt %, 7.5 wt %, and 10 wt % $NaNO_3$ to simulate deteriorating salt bath composition under high volume production conditions. Groups of alkali aluminosilicate glass samples were ion exchanged at 412° C. at each dilution level for 270 minutes. A subset from each group of samples was then ion exchanged in a bath containing fresh $KNO_3$ salt and a residual amount of $NaNO_3$ salt at approximately 410° C., for 120 minutes.

Surface compressive stress and depth of layer for each sample were measured immediately after the ion exchange process on an Orihara FSM-6000 stress-optical meter. Strength tests, including four point bend, ring on ring, and ball drop tests, were performed on all samples at the same time, to minimize measurement related variability. In addition, some samples were "aged" by abrasion with 220 grit sand paper, under a 200 g weight. These "aged" samples were also tested by the ring on ring apparatus, and the results from each condition, relative to each other as well as ring on ring tests of "virgin" (i.e., unabraded) samples, indicate their relative capabilities in containing existing flaws.

FIG. 1 is a plot of compressive stress versus dilution with $NaNO_3$ of the primary (IOX) and secondary (DIOX) ion exchange salt baths. The compressive stress of the samples after the primary or single stage of the ion exchange process steadily declines from 710 MPa to 477 MPa, as the $NaNO_3$ dilution increases from approximately 0 to 10 wt %. After these parts are ion exchanged in a secondary bath containing fresh salts, the average compressive stress recovers back to 750 to 765 MPa, which is comparable to the compressive stress observed for samples that have undergone single ion exchange with a fresh $KNO_3$ bath.

Figure 2:
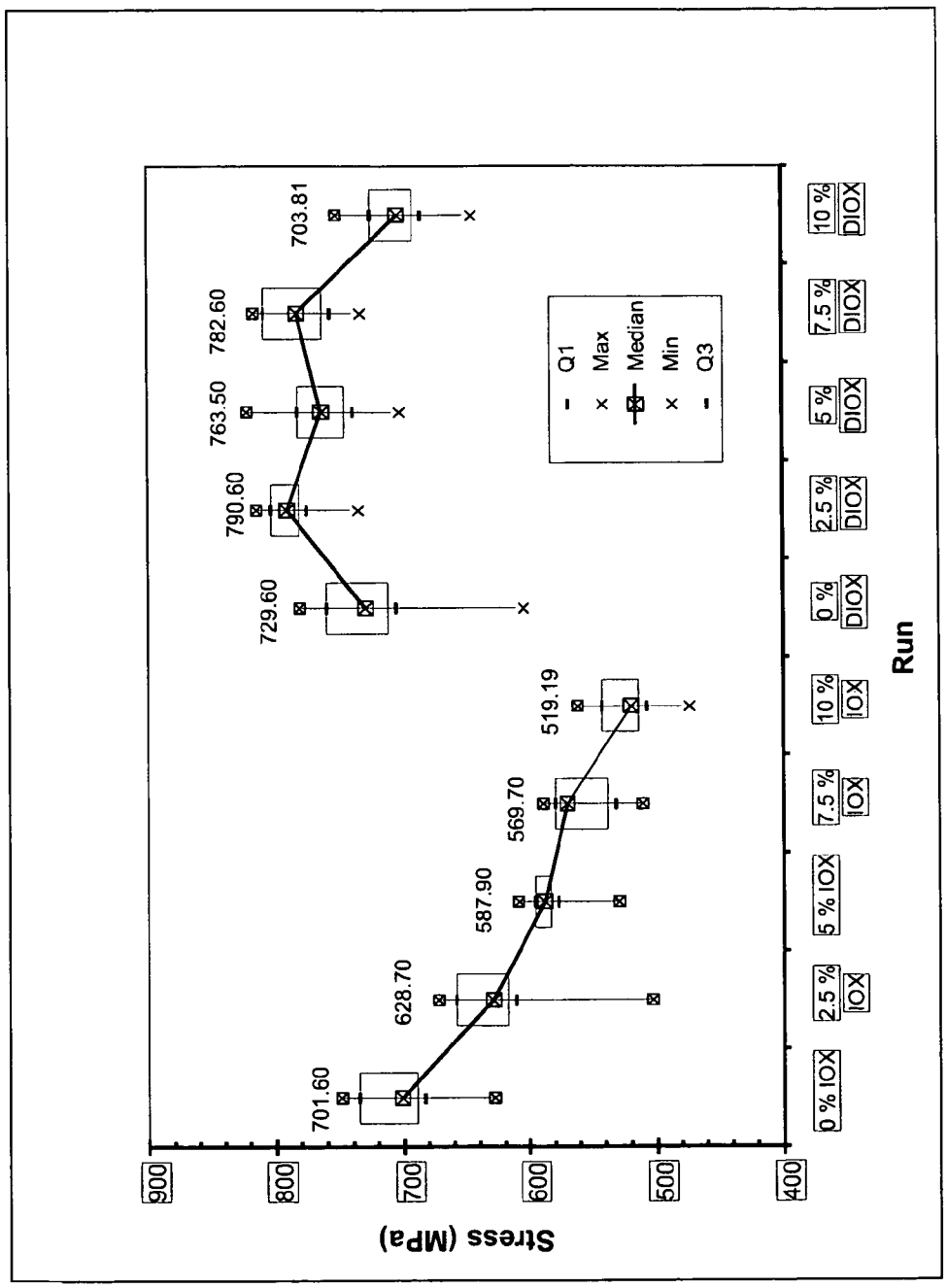
FIG. 2 is a plot of destructive four point bend surface stress measurements versus dilution with $NaNO_3$ of primary and secondary salt baths.

FIG. 2 is a plot of destructive four point bend surface stress measurements versus dilution with $NaNO_3$ of the primary (IOX) and secondary (DIOX) salt baths. The compressive stress of the samples after the primary or single stage of the ion exchange process steadily declines from 700 MPa to 520 MPa, as the $NaNO_3$ dilution increases from approximately 0 to 10 wt %. After these parts are ion exchanged in a second salt bath containing fresh salts, the average compressive stress recovers to 700 to 790 MPa, which is comparable to single ion exchange with a fresh $KNO_3$ bath. The results shown in FIG. 2 correlate with the compressive stress results shown in FIG. 1. Weibull plots show that the parts subjected to the fresh bath second stage ion exchange have significantly higher four point bend strength than those subjected to only single stage ion exchange having steadily increasing $NaNO_3$ dilution levels that are typical in high volume manufacturing.

Figure 3:
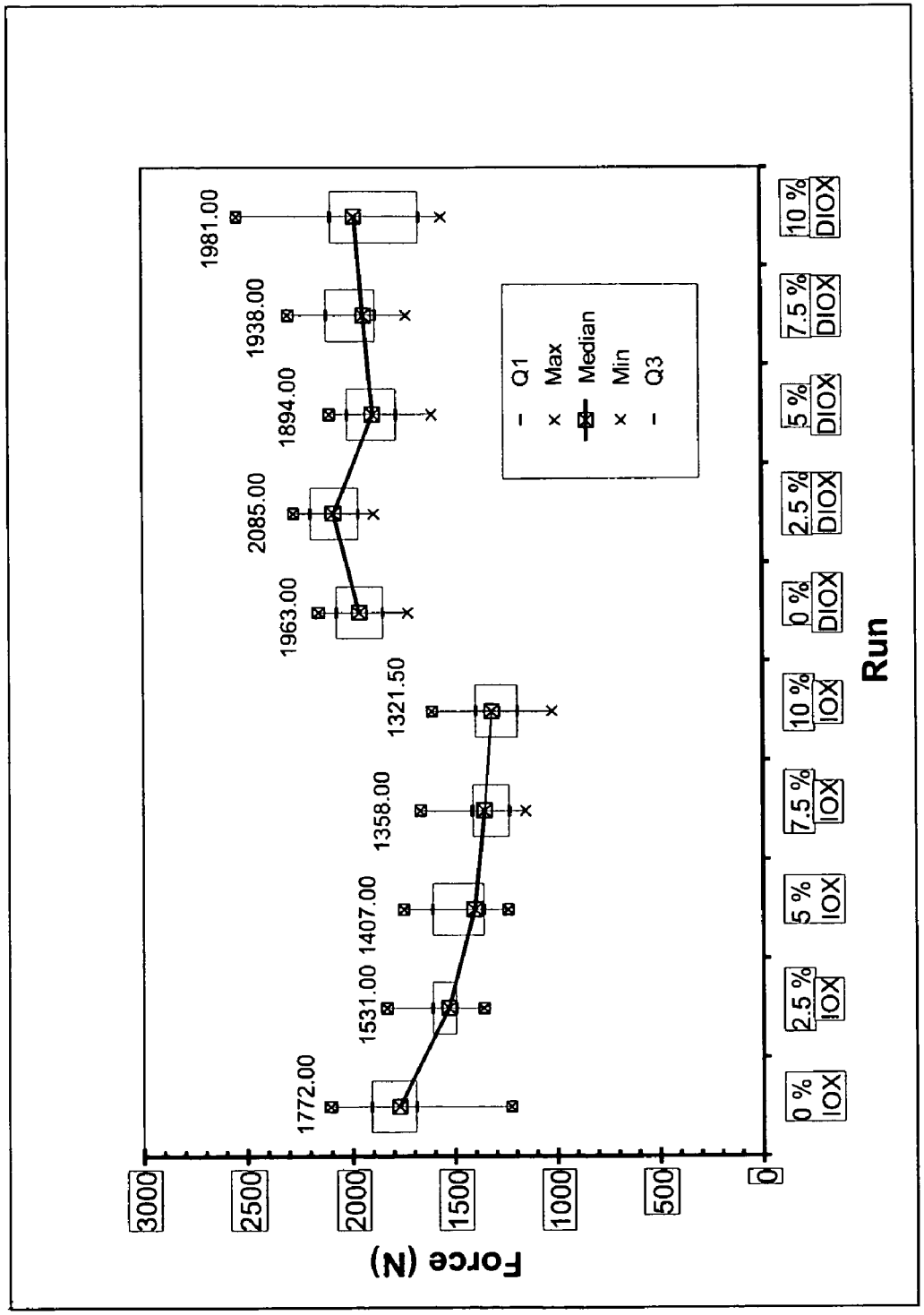
FIG. 3 is a plot of ring on ring force loading results versus dilution with NaNO$_3$ of primary and secondary salt baths.

FIG. 3 is a plot of ring on ring force loading results versus dilution with $NaNO_3$ of the primary (IOX) and secondary (DIOX) salt baths. The force loading steadily declines from 1800 N to 1320 N after single stage ion exchange, as the $NaNO_3$ dilution increases from approximately 0 to 10 wt %. After these parts are ion exchanged in a second fresh bath, the average force loading recovers to 1900 to 2000 N, which is comparable to single ion exchange with a fresh $KNO_3$ bath. The results shown in FIG. 3 correlate with the compressive stress results shown in FIG. 1. Weibull plots show that the parts subjected to the fresh bath second stage ion exchange have significantly higher ring on ring strength than those subjected to only single stage ion exchange having steadily increasing NaNO₃ dilution levels that are typical in high volume manufacturing.

Figure 4:
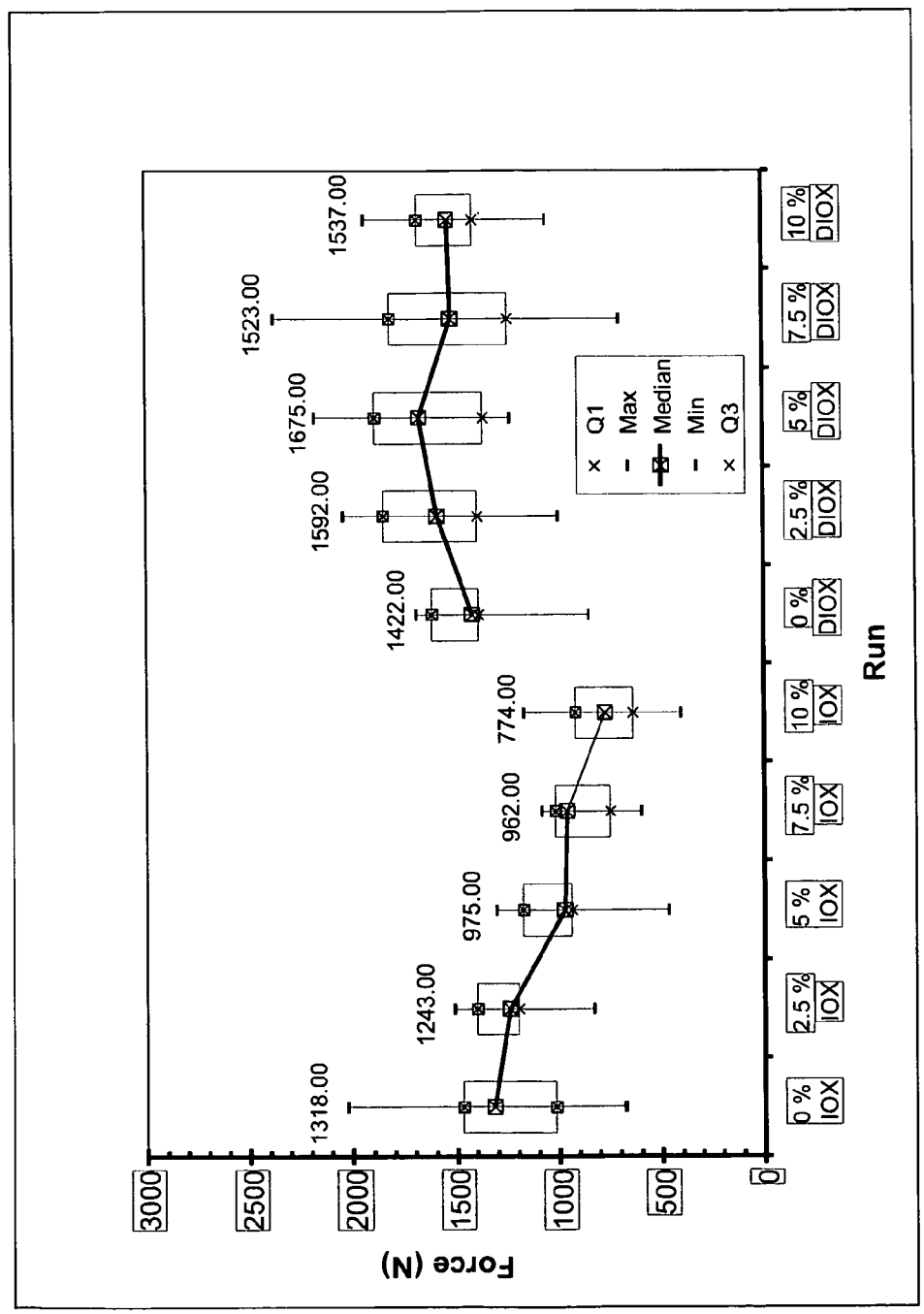
FIG. 4 is a plot of ring on ring force loading results versus dilution with NaNO$_3$ of primary and secondary salt baths for abraded glass samples.

FIG. 4 is a plot of ring on ring force loading results versus dilution with NaNO₃ of the primary (IOX) and secondary (DIOX) salt baths for glass samples that had been abraded or "aged" as described hereinabove. Force loading steadily declines from 1320 N to 770 N after single stage ion exchange, as the NaNO₃ dilution increases from approximately 0 to 10 wt %. After these parts are ion exchanged in a second fresh bath, the average force loading of abraded samples recovers to 1400 to 1700 N. The results shown in FIG. 3 correlate with the compressive stress results shown in FIG. 1. When compared with ring on ring results obtained for "virgin" (unabraded) samples (FIG. 3), the "aged" samples exhibit lower force loading and a larger spread of values. Weibull plots show that the abraded parts subjected to the fresh bath second stage ion exchange have significantly higher ring on ring strength than those subjected to only single stage ion exchange having steadily increasing NaNO₃ dilution levels that are typical in high volume manufacturing.

Figure 5:
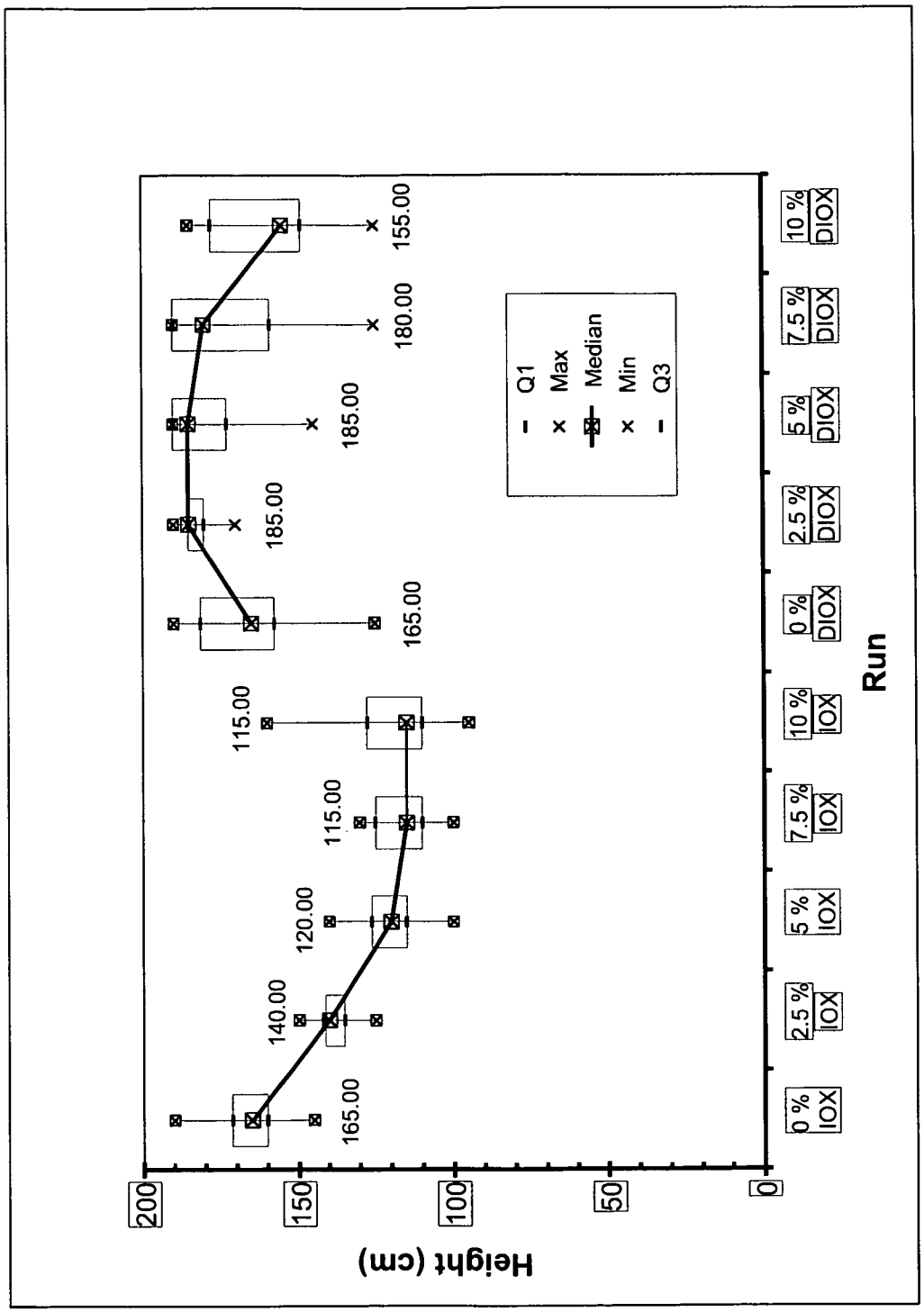
FIG. 5 is a plot of ball drop height results versus dilution with NaNO$_3$ of primary and secondary salt baths.

FIG. 5 is a plot of ball drop height results versus dilution with NaNO₃ of the primary (IOX) and secondary (DIOX) salt baths. The average ball drop height steadily decline from 165 cm to 115 cm after single stage ion exchange, as the NaNO₃ dilution increases from approximately 0 to 10 wt %. After these parts are ion exchanged in a second fresh bath, the average ball drop height recovers back to 155 cm to 185 cm, which is comparable to single ion exchange with a fresh KNO₃ bath. The results shown in FIG. 5 correlate with the compressive stress results shown in FIG. 1. Weibull plots show that the parts subjected to the fresh bath second stage ion exchange have significantly higher ball drop heights than those subjected to only single stage ion exchange having steadily increasing NaNO₃ dilution levels that are typical in high volume manufacturing.

While typical embodiments have been set forth for the purpose of illustration, the foregoing description should not be deemed to be a limitation on the scope of the invention. For example, additional ion exchange steps may be used achieve the desired compressive stress level and profile. Other metal ions, such as silver or the like, may be used instead of or in combination with alkali metal ions in the ion exchange process. In addition, other means of strengthening the glass, such as other chemical strengthening processes, annealing, or thermal tempering processes, may be used in combination with ion exchange. Accordingly, various modifications, adaptations, and alternatives may occur to one skilled in the art without departing from the spirit and scope of the present invention.

The invention claimed is:

1. A method of strengthening a glass, the method comprising:
   creating a compressive stress in an outer region of the glass, the region extending from a surface of the glass to a depth-of-layer, the compressive stress being sufficient to arrest flaws within the glass and to arrest flaws at the surface introduced by contact forces at the surface, and wherein the compressive stress is created by:
   a. providing a glass, the glass having a plurality of a first metal ions within the outer region, wherein the first metal ion is Na⁺;
   b. ion exchanging a first portion of the plurality of the first metal ions in the glass with a plurality of a second metal ions in a first salt bath, the first salt bath comprising up to 7.5 wt % of at least one salt containing the first metal ion, wherein the second metal ion is K⁺, and wherein the first salt bath is diluted with a first concentration of the first metal ions; and
   c. ion exchanging a second portion of the plurality of the first metal ions in the glass with a plurality of the second metal ions in a second salt bath, wherein the second salt bath has a second concentration of the first metal ion that is less than the first concentration.

2. The method of claim 1, wherein the glass is an alkali aluminosilicate glass.

3. The method of claim 2, wherein the alkali aluminosilicate glass comprises: 64 mol %≦SiO₂≦68 mol %; 12 mol %≦Na₂O≦16 mol %; 8 mol %≦Al₂O₃≦12 mol %; 0 mol %≦B₂O₃≦3 mol %; 2 mol %≦K₂O≦5 mol %; 4 mol %≦MgO≦6 mol %; and 0 mol %≦CaO≦5 mol %, and wherein: 66 mol %≦SiO₂+B₂O₃+CaO≦69 mol %; Na₂O+K₂O+B₂O₃+MgO+CaO+SrO>10 mol %; 5 mol %≦MgO+CaO+SrO≦8 mol %; (Na₂O+B₂O₃)−Al₂O₃≦2 mol %; 2 mol %≦Na₂O−Al₂O₃≦6 mol %; and 4 mol %≦(Na₂O+K₂O)−Al₂O₃≦10 mol %.

4. The method of claim 3, wherein the glass has a liquidus viscosity of at least 130 kilopoise.

5. The method of claim 4, wherein the glass has a thickness in a range from about 0.5 mm up to about 5 mm.

6. The method of claim 2, wherein the alkali aluminosilicate glass comprises: 60-70 mol % SiO₂; 6-14 mol % Al₂O₃; 0-15 mol % B₂O₃; 0-15 mol % Li₂O; 0-20 mol % Na₂O; 0-10 mol % K₂O; 0-8 mol % MgO; 0-10 mol % CaO; 0-5 mol % ZrO₂; 0-1 mol % SnO₂; 0-1 mol % CeO₂; less than 50 ppm As₂O₃; and less than 50 ppm Sb₂O₃; wherein 12 mol %≦Li₂O+Na₂O+K₂O≦20 mol % and 0 mol %≦MgO+CaO≦10 mol %.

7. The method of claim 1, wherein the glass is one of a planar sheet and a three-dimensional curved sheet.

8. The method of claim 1, wherein the outer region has a depth of layer of at least 50 μm.

9. The method of claim 1, wherein the compressive stress is at least about 200 MPa.

10. The method of claim 9, wherein the glass is an alkali aluminosilicate glass.

11. The method of claim 10, wherein the glass is an alkali aluminosilicate glass.

12. The method of claim 1, further including the step of annealing between immersion in the first salt bath and the second salt bath.

13. A method of strengthening a glass, the method comprising the steps of:
   a. providing a glass, the glass comprising a plurality of ions of a first metal, having a first ionic radius, wherein the first metal is sodium;
   b. immersing the glass in a first ion exchange bath, the first ion exchange bath comprising up to 7.5 wt % of at least one salt of the first metal, a plurality of ions of a second metal wherein the second metal is potassium, and a first concentration of ions of the first metal, and wherein each of the ions of the second metal has a second ionic radius, the second ionic radius being greater than the first ionic radius; and
   c. immersing the glass in a second ion exchange bath after immersing the glass in the first ion exchange bath, the second ion exchange bath comprising a plurality of ions of the second metal, and a second concentration of ions of the first metal, wherein the second concentration is less than the first concentration, and wherein a portion of the plurality of ions of the first metal in the glass are replaced by ions of the second metal to create a compressive stress in a surface region of the glass.

14. The method of claim 13, further including the step of annealing between immersion in the first ion exchange bath and the second ion exchange bath.

15. A method of reducing variability of compressive stress in chemically strengthened glass articles; the method comprising the steps of:
   a. providing a glass article, the glass comprising a plurality of ions of a first metal having a first ionic radius, wherein the first metal is sodium;
   b. immersing the glass article in a first ion exchange bath, the first ion exchange bath comprising up to 7.5 wt % of at least one salt of the first metal, a plurality of ions of a second metal, wherein the second metal is potassium, and a first concentration of ions of the first metal, wherein each of the ions of the second metal has a second ionic radius, the second ionic radius being greater than the first ionic radius; and
   c. immersing the glass article in a second ion exchange bath after immersing the glass in the first ion exchange bath, the second ion exchange bath comprising a plurality of ions of the second metal: and a second concentration of ions of the first metal, wherein the second concentration is less than the first concentration, wherein a portion of the plurality of ions of the first metal in the glass are replaced by ions of the second metal to create a compressive stress in a surface region of the glass, and wherein the compressive stress is greater than a predetermined value of compressive stress.

16. The method of claim 15, further including the step of annealing between immersion in the first ion exchange bath and the second ion exchange bath.

* * * * *